US007818104B2

(12) United States Patent
Tahara et al.

(10) Patent No.: US 7,818,104 B2
(45) Date of Patent: Oct. 19, 2010

(54) MONITORING APPARATUS AND METHOD (75) Inventors: Tatsuya Tahara, Toyota (JP); Shunsuke Kondo, Fukuroi (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 338 days.

(21) Appl. No.: 12/034,885

(22) Filed: Feb. 21, 2008

(65) Prior Publication Data

US 2008/0208404 A1 Aug. 28, 2008

(30) Foreign Application Priority Data

Feb. 23, 2007 (JP) ............... 2007-043590

(51) Int. Cl.
*G01M 17/00* (2006.01)
(52) U.S. Cl. ............ 701/29; 701/35; 701/103; 123/516; 123/698; 123/520; 123/519; 123/521; 340/439; 73/118.01; 477/200
(58) Field of Classification Search ............. 701/29, 701/31, 34, 35, 101–103, 106, 107; 123/674, 123/677, 679, 683, 516, 698, 520, 519, 521; 73/118.1; 477/200; 340/439
See application file for complete search history.

(56) References Cited

U.S. PATENT DOCUMENTS

| 4,502,442 | A | * | 3/1985 | Takakuwa et al. | ...... | 123/406.23 |
| 4,864,998 | A | * | 9/1989 | Onishi | ......... | 123/674 |
| 4,911,129 | A | * | 3/1990 | Tomisawa | ........ | 123/674 |
| 5,052,357 | A | * | 10/1991 | Fujimoto et al. | ........ | 123/339.21 |
| 5,216,991 | A | * | 6/1993 | Iida et al. | ............ | 123/339.23 |
| 5,614,667 | A | * | 3/1997 | Hosoya | .......... | 73/114.36 |
| 5,731,514 | A | * | 3/1998 | Miwa et al. | .......... | 73/114.39 |
| 6,047,692 | A | * | 4/2000 | Toyoda | .......... | 123/698 |
| 2007/0023020 | A1 | * | 2/2007 | Yoshidome | .......... | 123/672 |

FOREIGN PATENT DOCUMENTS

| JP | 8-247888 A | 9/1996 |
| JP | 11-294233 A | 10/1999 |
| JP | 2004-52599 A | 2/2004 |
| JP | 2005-325794 A | 11/2005 |

* cited by examiner

*Primary Examiner*—Tuan C To
*Assistant Examiner*—Redhwan Mawari
(74) *Attorney, Agent, or Firm*—Sughrue Mion, PLLC (57) ABSTRACT A comparator compares the total intake air amount accumulated by an accumulator with a reference value obtained via a selector. If the total intake air amount is smaller than the reference value, the CSS control is determined as being abnormal and a CSS-abnormality signal is output. If the number of times an atmospheric pressure learning value has been updated is equal to or larger than a threshold that is set large enough to determine that the accuracy of the calculated atmospheric pressure learning value is sufficiently high, a reference value is output from a characteristic storage to the comparator. Conversely, if the number of times the atmospheric pressure learning value has been updated is smaller than the threshold, an initial reference value is output from an initial reference value storage to the comparator.

22 Claims, 10 Drawing Sheets

MONITORING APPARATUS AND METHOD

INCORPORATION BY REFERENCE

The disclosure of Japanese Patent Application No. 2007-043590 filed on Feb. 23, 2007 including the specification, drawings and abstract is incorporated herein by reference in its entirety

BACKGROUND OF THE INVENTION

1. Field of the Invention

The invention relates to monitoring apparatuses and methods for monitoring the operation state of an internal combustion engine, and in particular relates to such apparatuses and methods in which the total intake air amount is monitored using an atmospheric pressure calculated though a particular learning process.

2. Description of the Related Art

In recent years, various measures have been taken to reduce the environmental stress due to emissions of motor vehicles. As one of such measures environment-oriented internal combustion engines have been developed which reduce the emissions by optimizing the throttle opening degree, the ignition timing, the fuel injection timing, the fuel injection amount, the operation timing of intake and exhaust valves, and so on, under various conditions.

Such optimization control by environment-oriented internal combustion engines uses a particular control logic when the internal combustion engine has been started at a lower temperature. Because an internal combustion engine runs by combusting fuel, the temperature of the internal combustion engine becomes high as it continues to run. Therefore, typically, internal combustion engines are designed such that an optimum combustion state is accomplished at a certain high temperature. Meanwhile, in the case where the internal combustion engine has been started after it was stopped for a long period of time, the temperature of the internal combustion engine remains low for a while after the engine start and in such a state, a desired combustion state may not be accomplished. To cope with this, the aforementioned cold-engine control logic is used to optimize fuel combustion in a cold condition immediately after the engine start.

The exhaust substances that are emitted from an internal combustion engine in a cold condition immediately after the engine start are called "cold-start emissions", and the engine control for reducing such cold-start emissions is called "CSS (Cold Start Strategy) control".

Some of the motor vehicles incorporating an internal combustion engine enabling the CSS control are provided with a monitoring apparatus for monitoring the state of the CSS control, and such a monitoring apparatus is called "CSS monitor" and used to monitor whether the CSS control is being or has been properly executed. More specifically, the CSS monitor ascertains the presence of an abnormality in the operation state of the internal combustion engine based on, for example, the amount of intake air to the internal combustion engine.

Because oxygen is used to combust fuel in an internal combustion engine, the necessary amount of air changes according to the air density. That is, the optimum amount of air changes according to the atmospheric pressure, and therefore a reference value used by the CSS monitor needs to be changed according to the atmospheric pressure.

In order to change such a characteristic value according to the atmospheric pressure, typically, a learning process based on a certain record is employed. For example, Japanese Patent Application Publication No. 11-294233 (JP-A-11-294233) recites an idling speed control apparatus for an internal combustion engine. This idling speed control apparatus controls the idling speed of the internal combustion engine to a target speed by estimating the intake air amount accurately without using any atmospheric pressure sensor even when the vehicle has moved from a low altitude to a high altitude and thereby minimizes the deviation of the actual air-fuel ratio in exhaust gas from the target air-fuel ratio and thus an increase in the exhaust emissions. The idling speed control apparatus has an ISC airflow rate learning value updating portion that updates a learning value used to correct the flow rate of air flowing in a bypass passage, which rate depends on the degree of opening of a flow rate control valve, in accordance with the airflow rate measured by an airflow meter.

In order to achieve a sufficiently high calculation accuracy in the aforementioned learning process, the degree of learning (e.g., the number of times the learning value has been updated) is required to be sufficiently high. That is, a sufficient calculation accuracy can not be achieved as long as the learning degree is low.

Therefore, the atmospheric pressure can not be accurately detected after the learning value has been reset (zeroed) as a result of excessive power discharge from a battery (so-called "dead battery") or as a result of a control unit being replaced with a new one. In such a case, therefore, there is a possibility that the operation state of the internal combustion engine is erroneously determined as being abnormal despite that the internal combustion engine is operating normally. Note that other related technologies are described in Japanese Patent Application Publications No. 07-247888 (JP-A-07-24788), No. 2005-325794 (JP-A-2005-325794), and No. 2004-052599 (JP-A-2004-052599).

SUMMARY OF THE INVENTION

The invention provides monitoring apparatuses that minimize the possibility that the operation state of an internal combustion engine be erroneously determined as being abnormal due to the accuracy of a calculated atmospheric pressure learning value being low.

An aspect of the invention relates to a monitoring apparatus for monitoring an operation state of an internal combustion engine, which has: an atmospheric pressure obtaining portion that obtains an atmospheric pressure; a learning value calculating portion that calculates an atmospheric pressure learning value based on a record of the atmospheric pressure obtained by the atmospheric pressure obtaining portion; an air amount accumulating portion that accumulates the amount of air drawn into the internal combustion engine for a predetermined period of time; and an abnormality determination portion that determines the operation state of the internal combustion engine as being abnormal when the accumulated air amount is smaller than a predetermined reference value corresponding to the atmospheric pressure learning value. The reference value is set in accordance with the atmospheric pressure learning value and the degree of learning that the learning value calculating portion has performed for the atmospheric pressure learning value.

According to the monitoring apparatus described above, the operation state of the internal combustion engine is determined as being abnormal when the accumulated amount of air drawn into the internal combustion engine for the predetermined period of time is smaller than the predetermined reference value corresponding to the atmospheric pressure learning value, and the reference value is set in accordance with the degree of learning that the learning value calculating portion has performed for the atmospheric pressure learning value, as well as the atmospheric pressure learning value itself. As such, the reference value can be set to a value with which the CSS control will not be erroneously determined as being abnormal even in a state where the degree of the learning for the atmospheric pressure learning value is not sufficient, such as after excessive power discharge from a battery or after a control unit has been replaced with a new one.

The above-described monitoring apparatus may further have, a comparing portion that compares the number of times the atmospheric pressure learning value has been updated by the learning value calculating portion with a predetermined threshold; and a reference value setting portion that sets the reference value to a value corresponding to an initial value of the atmospheric pressure learning value, which has been set in advance by the learning value calculating portion, when the number of times the atmospheric pressure learning value has been updated by the learning value calculating portion is smaller than the threshold.

Another aspect of the invention relates to a monitoring apparatus for monitoring an operation state of an internal combustion engine, which has: an atmospheric pressure obtaining portion that obtains an atmospheric pressure; a learning value calculating portion that calculates an atmospheric pressure learning value based on a record of the atmospheric pressure obtained by the atmospheric pressure obtaining portion; an air amount accumulating portion that accumulates the amount of air drawn into the internal combustion engine for a predetermined period of time; an abnormality determination portion that determines the operation state of the internal combustion engine as being abnormal when the accumulated air amount is smaller than a predetermined reference value corresponding to the atmospheric pressure learning value; and an invalidating portion that invalidates the abnormality determination function of the abnormality determination portion when the number of times the atmospheric pressure learning value has been updated by the learning value calculating portion is smaller than a predetermined threshold.

According to the monitoring apparatus described above, the operation state of the internal combustion engine is determined as being abnormal when the accumulated amount of air drawn into the internal combustion engine for the predetermined period of time is smaller than the predetermined reference value, and if the number of times the atmospheric pressure learning value has been updated is smaller than the predetermined threshold, the determination process for determining whether the operation state of the internal combustion engine is abnormal is invalidated. Thus, the abnormality determination for the internal combustion engine is not made in a state where the degree of learning for the atmospheric pressure learning value is not sufficient, such as after excessive power discharge from a battery or after a control unit has been replaced with a new one.

Further, the above-described monitoring apparatuses may be such that the internal combustion engine includes a throttle mechanism that controls the flow rate of air drawn into the internal combustion engine and the atmospheric pressure obtaining portion calculates the atmospheric pressure based on the degree of opening of the throttle mechanism and the flow rate of air drawn into the internal combustion engine, Further the above-described monitoring apparatuses may be such that the air amount accumulating portion starts accumulating the amount of air drawn into the internal combustion engine from a start of the internal combustion engine.

Further, the above-described monitoring apparatuses may be such that the internal combustion engine runs by combusting gasoline.

Another aspect of the invention relates to a method for monitoring an operation state of an internal combustion engine, which includes: obtaining an atmospheric pressure; calculating an atmospheric pressure learning value based on a record of the obtained atmospheric pressure; accumulating the amount of air drawn into the internal combustion engine for a predetermined period of time; and determining the operation state of the internal combustion engine as being abnormal when the accumulated air amount is smaller than a predetermined reference value corresponding to the atmospheric pressure learning value; and setting the reference value in accordance with the atmospheric pressure learning value and the degree of learning that has performed for the atmospheric pressure learning value.

As such, the monitoring apparatuses and method of the invention minimize the possibility of the operation state of the internal combustion engine being erroneously determined as being abnormal due to the accuracy of the calculated atmospheric pressure learning value being low.

BRIEF DESCRIPTION OF THE DRAWINGS

The foregoing and further features and advantages of the invention will become apparent from the following description of preferred embodiments with reference to the accompanying drawings, wherein like numerals are used to represent like elements and wherein.

DETAILED DESCRIPTION OF THE EMBODIMENTS

Example embodiments of the invention will hereinafter be described in detail with reference to the drawings. Note that like elements and components are denoted by like reference numerals and their descriptions are not repeated.

First Example Embodiment

Overall Configuration of Vehicle

Figure 1:
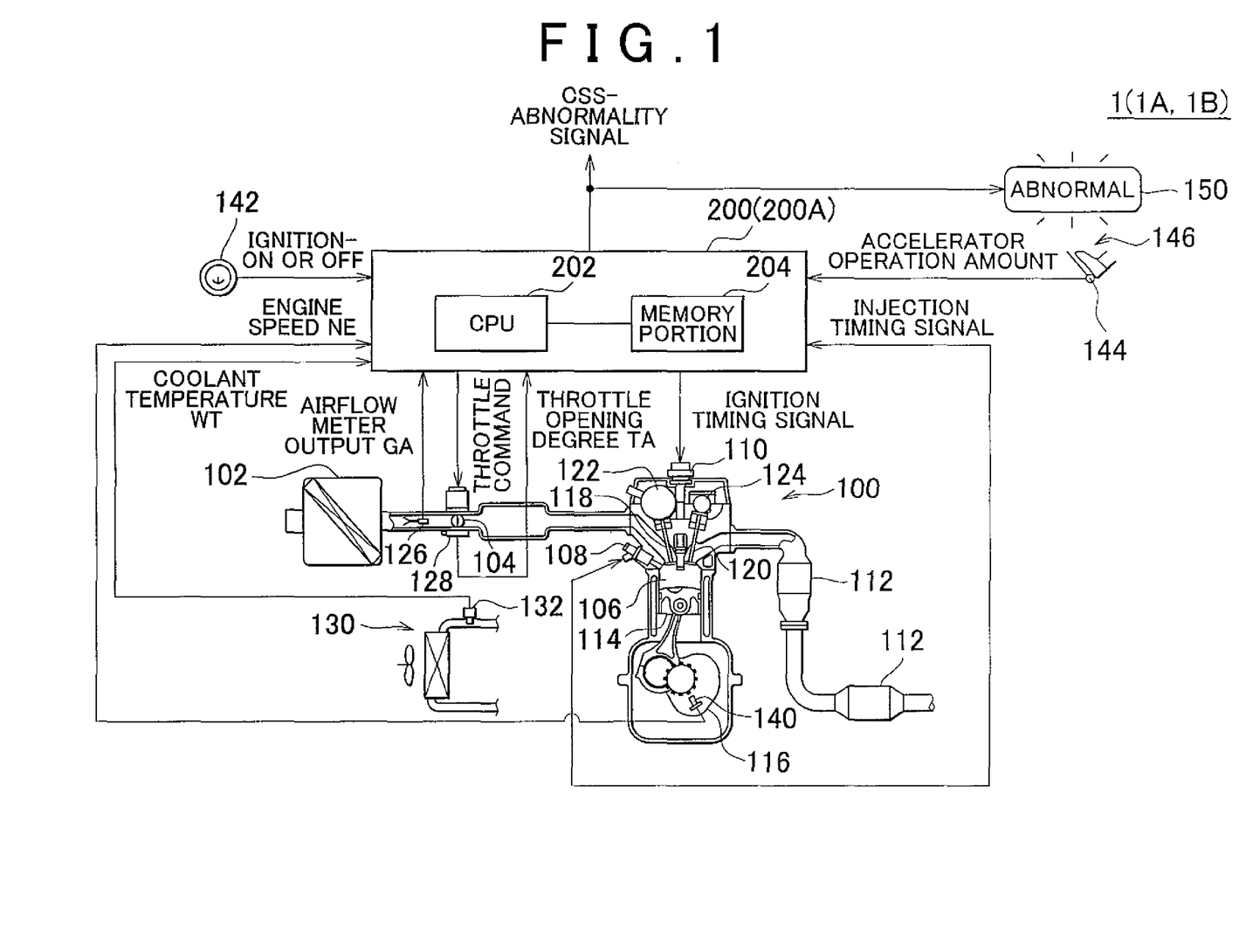
FIG. 1 is a view schematically showing the configuration of a main portion of a vehicle incorporating a motoring apparatus according to the first example embodiment of the invention.

FIG. 1 is a view schematically showing the configuration of a vehicle 1 incorporating a motoring apparatus according to the first example embodiment of the invention.

Referring to FIG. 1, the monitoring apparatus of the first example embodiment is, for example, implemented by various programs executed by a control apparatus 200. The vehicle 1 runs on the drive force obtained by combusting gasoline in a gasoline internal combustion engine (will be referred to as "engine") 100. Note that the vehicle 1 may alternatively be a hybrid vehicle having a motor in addition to the engine 100.

Air is drawn into the engine 100 via an air cleaner 102. The flow rate of air drawn into the engine 100 is adjusted by a throttle mechanism 104. The throttle mechanism 104 is, for example, an electrically-controlled throttle valve that is driven by a motor according to throttle commands from the control apparatus 200.

The control apparatus 200 issues the throttle commands in accordance with the amount the driver is stepping down an accelerator pedal 146 (accelerator operation amount) which is detected by an accelerator operation amount sensor 144. A throttle sensor 128 is provided to detect the degree of opening of the throttle valve of the throttle mechanism 104 (throttle opening degree TA). Further, a flow meter 126 is provided in a passage between the air cleaner 102 and the throttle mechanism 104 to detect the flow rate of air drawn into the engine 100 (air-flow meter output GA).

The air drawn into the engine 100 is delivered to each cylinder 106 (combustion chamber) and mixed with the fuel injected front an injector 108. For example, the injection nozzle of each injector 108 is provided in the cylinder 106, and fuel is directly injected into the cylinder 106 from the intake side of the cylinder 106 (the side to which air is supplied). The injection timing of each injector 108 is controlled by injection timing signals from the control apparatus 200. While FIG. 1 shows, as an example of the engine 100, a direct injection engine in which the injection nozzles of the injectors 108 are provided in the respective cylinders 106, the engine 100 may alternatively be a port-injection type engine having injectors provided in the intake ports.

In each cylinder 106, an air-fuel mixture is ignited by an ignition plug 110 and combusted. The ignition timing of each ignition plug 110 is controlled by ignition timing signals from the control apparatus 200. The air-fuel mixture that has been ignited by the ignition plug 110 and combusted, that is, exhaust gas is purified by a three-way catalyst 112 and then discharged to the outside of the vehicle.

Combustion of an air-fuel mixture pushes a piston 114 down, whereby a crankshaft 116 rotates. A crank angle sensor 140 detects the rotation speed of the crankshaft 116 (engine speed NE).

An intake valve 118 and an exhaust valve 120 are provided at the upper end of each cylinder 106. The intake valve 118 is used to control the amount of air introduced into the cylinder 106 and the timing of the air introduction, and the exhaust valve 120 is used to control the amount of gas discharged from the cylinder 106 and the timing of the gas discharge. The intake valves 118 are driven by cams 122, and the exhaust valves 120 are driven by cams 124.

An engine coolant passage (not shown in the drawings) is formed throughout the engine 100 and the heat of the engine 100 is radiated (cooled) via a radiator 130. A coolant sensor 132 is provided in the engine coolant passage to detect the temperature of the engine coolant (coolant temperature WT).

The control apparatus 200 is, for example, an ECU (Electronic Control Unit) constituted of a CPU (Central Processing Unit) 202 and a memory portion 204 including a RAM (Random Access Memory), a ROM (Read Only Memory), etc. The control apparatus 200 executes various programs stored in the memory portion 204 to control the throttle opening degree, the ignition timing, the fuel injection timing, the fuel injection amount, the operation timing of the intake and exhaust valves, and so on, so as to achieve a desired operation state of the engine 100 based on the signals input from various sensors, which will be described later, and various maps and programs stored in the memory portion 204.

In particular, in this example embodiment, the control apparatus 200 is adapted to determine the state of the engine 100 (i.e., whether the temperature of the engine 100 is low or high) based on the coolant temperature WT at the time of cranking, the engine 100 using a starter (not shown in the drawings) in response to an ignition-ON signal that is output from an ignition switch 142 when it is operated by the driver. At this time, if the temperature of the engine 100 is low, the control apparatus 200 executes a particular control procedure for reducing the engine emissions that are produced when the engine 100 is running at a low temperature (cold-start emissions). This control procedure will be referred to as "CSS control".

The control apparatus 200 accumulates the amount of air drawn into the engine 100 for a predetermined period of time (e.g., 20 seconds) after the start of the engine 100 based on the airflow rate detected by the flow meter 126 (airflow meter output GA). After the predetermined period of time has passed, the control apparatus 200 then compares the accumulated air amount with a reference value. If the accumulated air amount is smaller than the reference value, the control apparatus 200 determines the CSS control of the engine 100 as being abnormal, and then turns on a warning light 150 or makes it blink to indicate the abnormality to the driver while outputting a diagnosis code indicative of the abnormality (CSS-abnormality signal).

Functional Configuration of Control Apparatus

Figure 2:
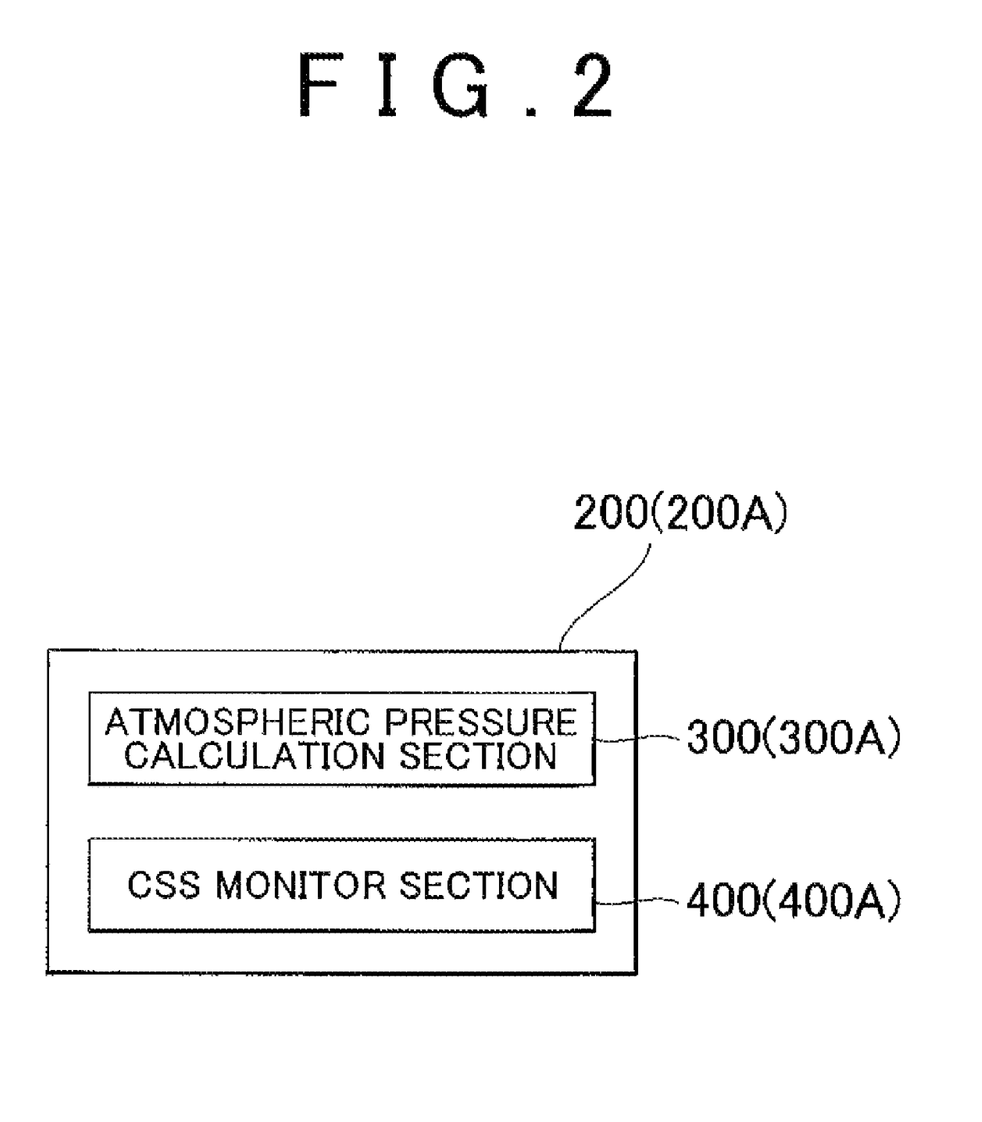
FIG. 2 is a block diagram illustrating the outline of the functional configuration of the control apparatus of the first example embodiment of the invention.

FIG. 2 is a block diagram illustrating the outline of the functional configuration of the control apparatus 200 of the first example embodiment.

Referring to FIG. 2, the control apparatus 200 includes, as its functional sections, an atmospheric pressure calculation section 300 and a CSS monitor section 400. The atmospheric pressure calculation section 300 obtains the atmospheric pressure and calculates an atmospheric pressure learning value based on the record of the obtained atmospheric pressure. That is, the control apparatus 200 repeatedly obtains the atmospheric pressure at given control cycles and updates the atmospheric pressure learning value according to the atmospheric pressure obtained each time. The atmospheric pressure calculation section 300 calculates the atmospheric pressure without using any atmospheric pressure, as will be described in detail later.

The CSS monitor section 400 monitors whether an abnormality has occurred in the CSS control using the atmospheric pressure learning value calculated by the atmospheric pressure calculation section 300. More specifically, the CSS monitor section 400 accumulates the amount of air that is drawn into the engine 100 for a predetermined period of time after the start of the engine 100 and determines whether the accumulated air amount is lower than a reference value corresponding to the atmospheric pressure learning value calculated. In order to avoid erroneously determining the CSS control as being abnormal, the CSS monitor section 400 sets the reference value in accordance with not only the atmospheric pressure learning value, but also the degree of the learning that the atmospheric pressure calculation section 300 has performed for the atmospheric pressure learning value.

Atmospheric Pressure Calculation Section

Figure 3:
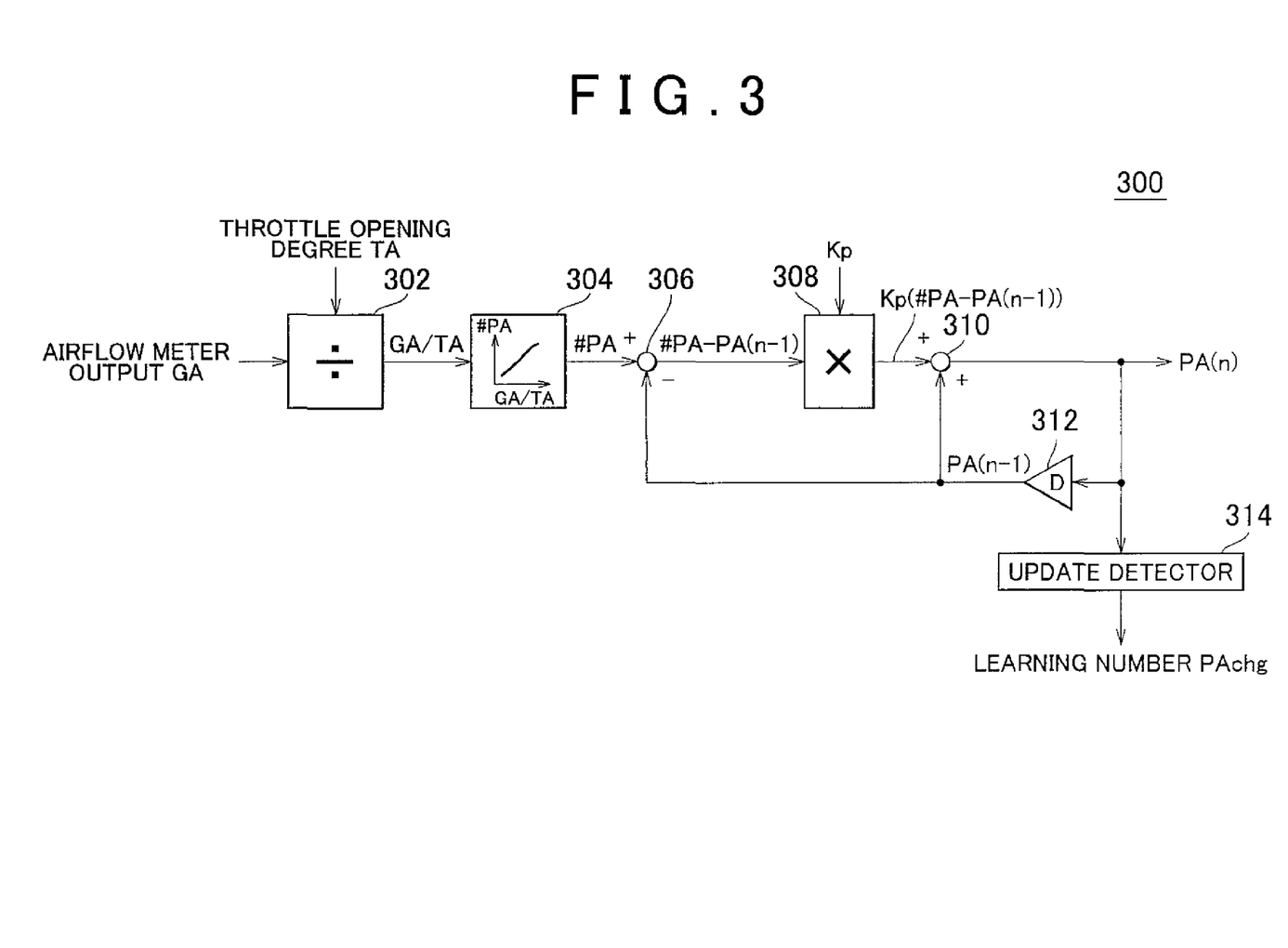
FIG. 3 is a block diagram illustrating the outline of the functional configuration of the atmospheric pressure calculation section of the first example embodiment of the invention.

FIG. 3 is a block diagram illustrating the outline of the functional configuration of the atmospheric pressure calculation section 300 of the first example embodiment.

Referring to FIG. 3, the atmospheric pressure calculation section 300 includes a divider 302, a characteristic storage 304, a subtractor 306, a multiplier 308, an adder 310, and a delayer (D) 312, and an update detector 314.

The divider 302 and the characteristic storage 304 are used to obtain the atmospheric pressure in each control cycle. The atmospheric pressure is calculated based on the throttle opening degree TA obtained from the throttle sensor 128 (FIG. 1) and the airflow meter output GA obtained from the flow meter 126 (FIG. 1), rather than being detected using an atmospheric pressure sensor. More specifically, when the engine 100 is normally operating, the flow rate of air drawn into the engine 100 (the airflow meter output GA) is decided based on given relations with the throttle opening degree TA and the atmospheric pressure. Thus, the ratio of the throttle opening degree TA to the airflow meter output GA (GA/TA) has a certain relation with the atmospheric pressure. Therefore, a map defining the relation between the ratio GA/TA and an atmospheric pressure #PA is empirically formulated in advance and the map is stored in the characteristic storage 304. Based on this map, the characteristic storage 304 outputs the value of the atmospheric pressure #PA corresponding to the ratio GA/TA calculated by the divider 302.

The subtractor 306, the multiplier 308, the adder 310, and the delayer 312 are used to calculate, through a particular learning process, an atmospheric pressure learning value PA (n) based on the record of the atmospheric pressure #PA calculated in each control cycle. The variation of the atmospheric pressure #PA output from the characteristic storage 304 in each control cycle may become relatively large depending upon the operation state of the engine 100, the detection accuracies of the respective sensors, and so on, despite the fact that the actual atmospheric pressure varies relatively slowly. Thus, the learning-based calculation is performed to ensure that the atmospheric pressure learning value PA (n) is calculated in a stable manner.

FIG. 3 illustrates an example case where the atmospheric pressure learning value PA (n) is calculated in a certain control cycle. The value of the atmospheric pressure learning value obtained in the previous control cycle is referred to as "previous atmospheric pressure learning value PA (n-1)". The data of the previous atmospheric pressure learning value PA (n-1) is held by the delayer 312 constituted of a resistor.

The subtractor 306 subtracts the previous atmospheric pressure learning value PA (n-1) from the atmospheric pressure #PA output from the characteristic storage 304 and then outputs the result to the multiplier 308. The multiplier 308 multiplies the value obtained from the subtractor 306 by a learning coefficient Kp (0<Kp<1) and then outputs the result to the adder 310. The adder 310 adds the previous atmospheric pressure learning value PA (n-1) to the value obtained from the multiplier 308 and outputs the result as the atmospheric pressure learning value PA (n). Thus, the following mathematical relation exists between the atmospheric pressure learning value PA (n) and the previous atmospheric pressure learning value PA (n-1).

$$\text{Atmospheric pressure learning value PA }(n) = Kp \times \#PA + (1-Kp) \times PA(n-1)$$

As such, in each control cycle, the previous atmospheric pressure learning value PA (n-1) is updated using the atmospheric pressure #PA calculated in the same control cycle whereby the latest atmospheric pressure learning value PA (n) is obtained. The procedure of the learning for calculating the atmospheric pressure learning value is not limited to the one illustrated in FIG. 3. That is, any procedure may be used as long as the atmospheric pressure learning value is calculated based on the record of the atmospheric pressure #PA calculated in each control cycle.

The update detector 314 of the atmospheric pressure calculation section 300 counts the number of times the atmospheric pressure learning value PA (n) is updated and outputs the counted number as a learning number PAchg.

Figure 4:
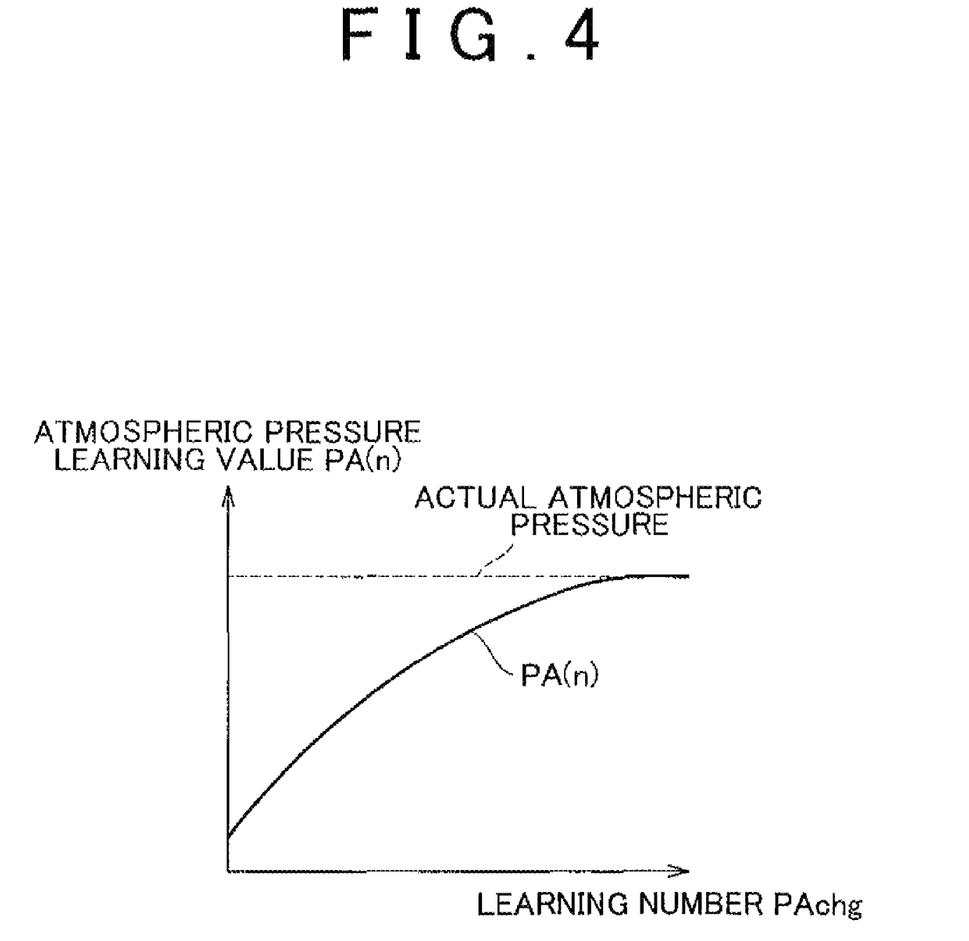
FIG. 4 is a graph illustrating an example of the characteristic of variation of the atmospheric pressure learning value in an initial stage of its learning process.

FIG. 4 is a graph illustrating an example of the characteristic of variation of the atmospheric pressure learning value PA (n) in an initial stage of its learning process. Referring to FIG. 4, as indicated by the above mathematical relation, the atmospheric pressure learning value PA (n) is calculated by multiplying the values of the atmospheric pressure #PA and the previous atmospheric pressure learning value PA (n-1) calculated in the present control cycle by given ratios, respectively, and then summing up the results. Therefore, in the initial stage of the learning process that is, when the atmospheric pressure learning value PA (0) is at its initial value (e.g., the atmospheric pressure at an altitude of 2400 m), the addition of the atmospheric pressure #PA needs to be repeated a relatively large number of times before the atmospheric pressure learning value PA (n) comes to indicate the actual atmospheric pressure accurately. In other words, it can be said that the accuracy of the calculated atmospheric pressure learning value PA (n) is low until the learning number PAchg output from the update detector 314 reaches a certain large value, and this value depends on the learning coefficient Kp, etc.

In view of this, as will be described later, the CSS monitor section 400 determines the accuracy of the calculated atmospheric pressure learning value PA (n) based on the learning number PAchg and selectively sets the above-described reference value so as to avoid erroneously determining the CSS control as being abnormal.

CSS Monitor Section

Figure 5:
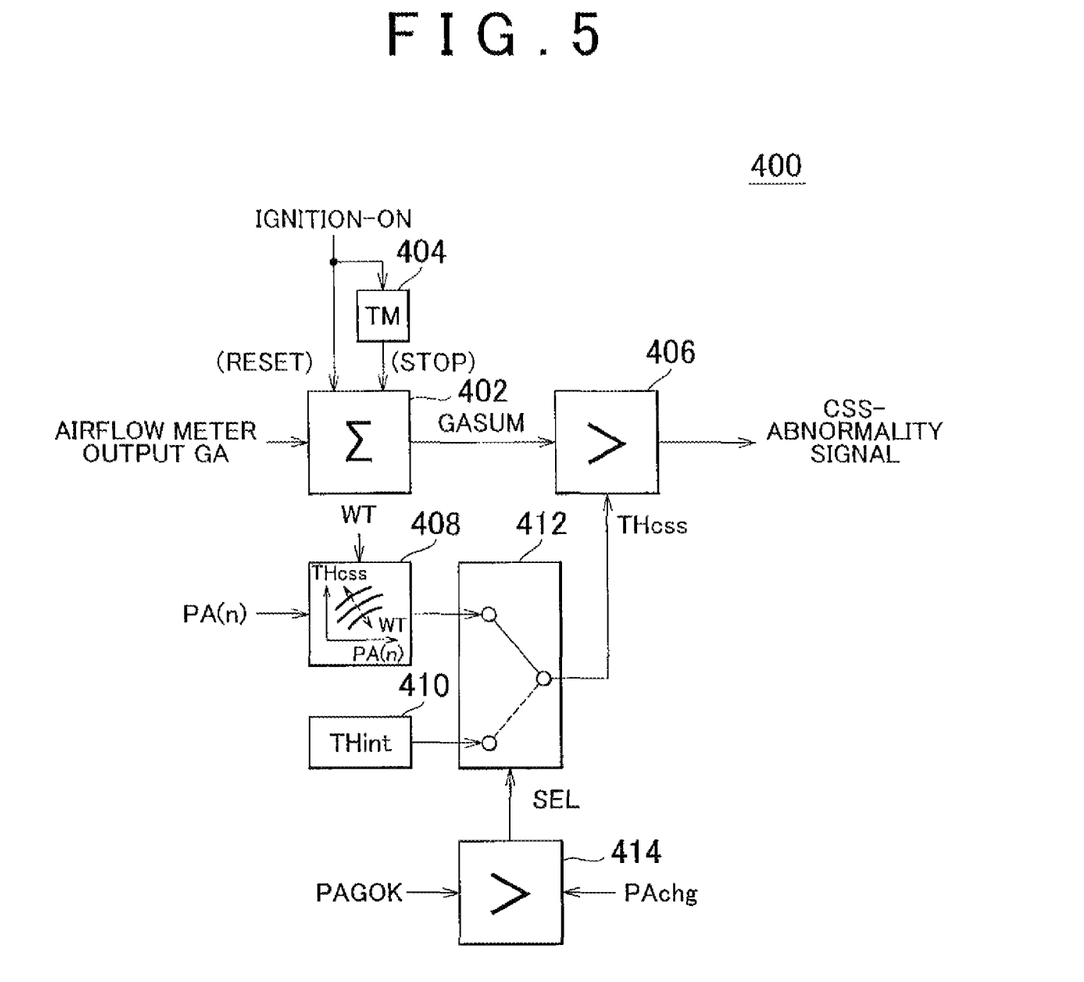
FIG. 5 is a block diagram illustrating the outline of the functional configuration of the CSS monitor section of the first example embodiment of the invention.

FIG. 5 is a block diagram illustrating the outline of the functional configuration of the CSS monitor section 400 of the first example embodiment.

Referring to FIG. 5, the CSS monitor section 400 includes an accumulator 402, a timer (TM) 404, comparators 406, 414, a characteristic storage 408, an initial value storage 410, and a selector 412.

The accumulator 402 and the timer 40 are used to calculate a total intake air amount GASUM representing the total amount of air that is drawn into the engine 100 for a certain period of time from the start of the engine 100. More specifically, in response to an ignition-ON signal being output from the ignition switch 142 (FIG. 1), the accumulator 402 clears the presently stored accumulated value and then starts accumulating the airflow meter output GA. At this time, in response to the same ignition-ON signal, the timer 404 starts counting a predetermined time period for which the accumulation of the airflow meter output GA is to be continued (e.g., 20 seconds). When the time count by the timer 404 has been finished, that is, when the predetermined time period has passed from the time the ignition was turned on, the timer 404 outputs a stop signal to the accumulator 402. In response to this stop signal the accumulator 402 stops accumulating the airflow meter output GA and then outputs the total intake air amount GASUM accumulated so far to the comparator 406.

Meanwhile, because the total intake air amount GASUM is calculated by accumulating the airflow meter output GA obtained when the engine 100 is idling, the accumulation of the airflow meter output GA may be suspended when the driver is racing the engine 100.

The comparator 406 is used to ascertain the presence of an abnormality of the CSS control based on the calculated total intake air amount GASUM. That is, the comparator 406 compares the total intake air amount GASUM accumulated by the accumulator 402 and a reference value THcss obtained via the selector 412. If the total intake air amount GASUM is smaller than the reference value THcss, the comparator 406 determines the CSS control as being abnormal and outputs the CSS-abnormality signal.

The characteristic storage 408, the initial value storage 410, and the selector 412 are used to set the reference value THcss in accordance with the atmospheric pressure learning value PA (n) and the learning number PAchg. The characteristic storage 408 stores a map indicating the characteristic of the reference value THcss defined in association with the atmospheric pressure learning value PA (n) and the coolant temperature WT, and the characteristic storage 408 outputs, when receiving the ignition-ON signal, the reference value THcss corresponding to the present atmospheric pressure learning value PA (n) and the present coolant temperature WT to the selector 412.

On the other hand, the initial value storage 410 stores an initial reference value THint that is normally used when the atmospheric pressure learning value PA (n) is at the initial value (e.g., the atmospheric pressure at an altitude of 2400 m).

The selector 412 outputs one of the reference value THcss obtained from the characteristic storage 408 and the initial reference value THint obtained from the initial value storage 410 to the comparator 406 in accordance with a selection command SEL output from the comparator 414.

The comparator 414 examines the accuracy of the calculated atmospheric pressure learning value PA (n) by comparing the learning number PAchg, which represents the number of times the atmospheric pressure calculation section 300 has updated the atmospheric pressure learning value PA (n), with a threshold PAGOK. The threshold PAGOK is set to a value that is large enough to determine that the accuracy of the calculated atmospheric pressure learning value PA (n) is sufficiently high, and if the learning number PAchg is equal to or larger than the threshold PAGOK, the characteristic storage 408 outputs the reference value THcss to the comparator 406, and, on the other hand, if the learning number PAchg is smaller than the threshold PAGOK, the initial value storage 410 outputs the initial reference value THint to the comparator 406.

As such, in the case where the learning for the atmospheric pressure learning value PA (n) has already been performed sufficiently and thus the accuracy of the calculated atmospheric pressure learning value PA (n) is high, the reference value THcss is used to ascertain the presence of an abnormality of the CSS control. On the other hand, in the case where the learning for the atmospheric pressure learning value PA (n) has not yet been performed sufficiently and thus the accuracy of the calculated atmospheric pressure learning value PA (n) is still low, the initial reference value THint corresponding to the initial value of the atmospheric pressure learning value PA (n) is used to ascertain the presence of an abnormality of the CSS control. By ascertaining the presence of an abnormality of the CSS control in this way, it is possible to avoid erroneously determining the CSS control as being abnormal even when the learning for the atmospheric pressure learning value PA (n) has not yet been performed sufficiently.

The initial reference value THint is set according to the initial value of the atmospheric pressure learning value PA (n), and therefore the initial reference value THint is substantially equal to the minimum value of the reference value THcss stored in the characteristic storage 408.

Flowchart

In the following, the flow of the processes executed by the control apparatus 200 according to the functional configuration described above will be described.

Figure 6:
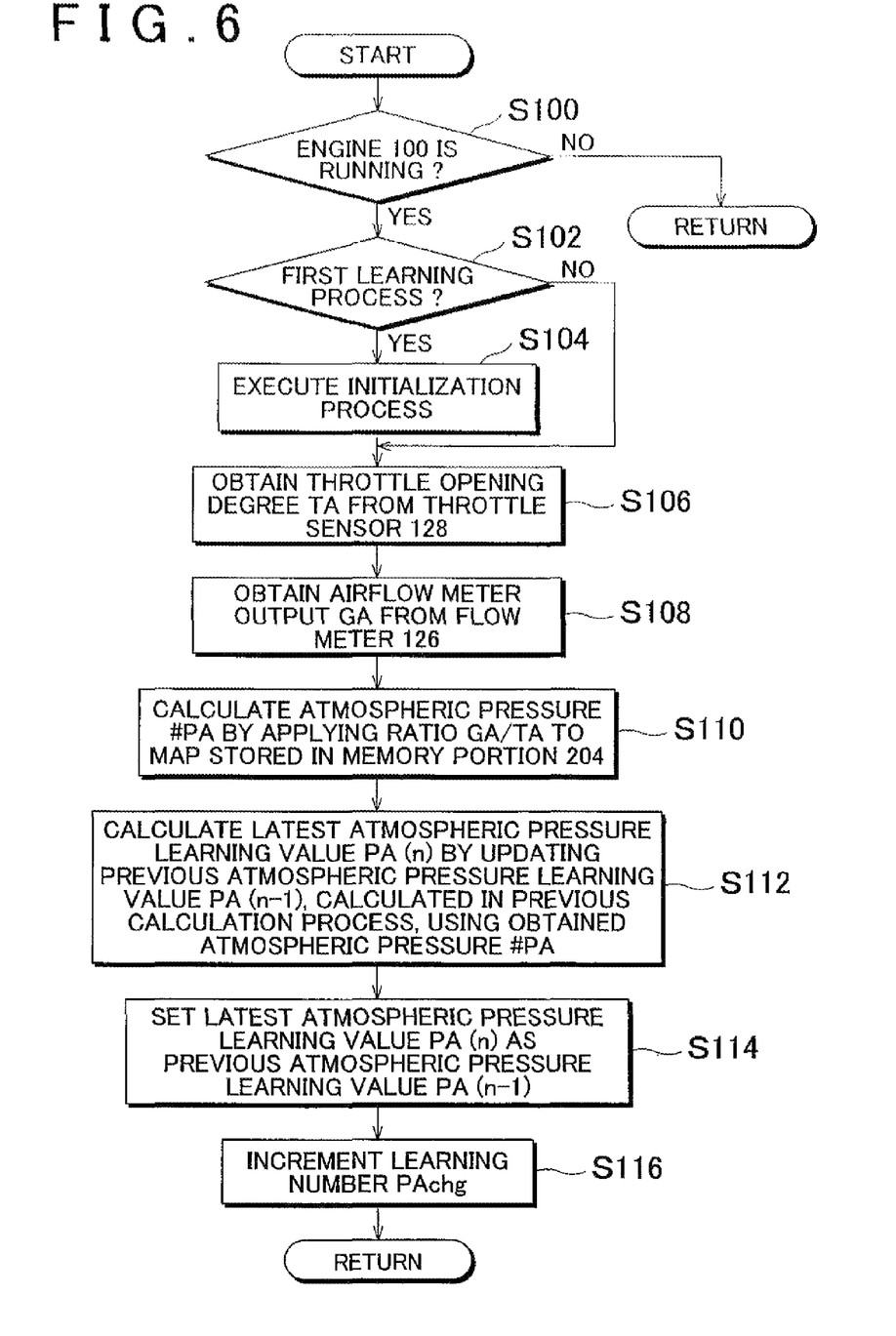
FIG. 6 is a flowchart illustrating the control routine executed by the atmospheric pressure calculation section of the first example embodiment of the invention.

FIG. 6 is a flowchart illustrating the control routine executed by the atmospheric pressure calculation section 300 of the first example embodiment. Note that the respective processes of the control routine are mainly executed by the CPU 202 of the control apparatus 200.

Referring to FIG. 6, the CPU 202 determines whether the engine 100 is presently running (step S100). If the engine 100 is not running (step S100: NO), the CPU 202 returns to the beginning of the control routine and starts it again. That is, the CPU 202 executes the processes in step S102 and its subsequent steps on the condition that the engine 100 is presently running.

If the engine 100 is presently running (step S100: YES), the CPU 202 then determines whether the learning process to be executed is the first learning process (step S102). Note that "the first learning process" is the learning process executed in the first cycle after the learning value, or the like, has been reset (zeroed) as a result of excessive power discharge from a battery or as a result of a control unit being replaced with a new one.

If the learning process to be executed is the first learning process (step 102: YES), the CPU 202 executes an initialization process (step 104). The initialization process includes initializing the previous atmospheric pressure learning value PA (n-1) and clearing (zeroing) the learning number PAchg.

When it has been determined in step S102 that the learning process to be executed is not the first learning process (step 102: NO) or after the initialization process in step S104 has been finished, the CPU 202 obtains the throttle opening degree TA from the throttle sensor 128 (step S106) and then obtains the airflow meter output GA from the flow meter 126 (step S108). Then, the CPU 202 obtains the atmospheric pressure #PA by applying the ratio GA/TA, which is the ratio of the throttle opening degree TA to the airflow meter output GA, to the map stored in the memory portion 204 (step S110). The CPU 202 then updates the previous atmospheric pressure learning value PA (n-1), which has been calculated in the previous calculation process, using the atmospheric pressure #PA obtained, whereby the latest atmospheric pressure learning value PA (n) is calculated (step S112). Then, the CPU 202 sets the latest atmospheric pressure learning value P as the previous atmospheric pressure learning value PA (n-1) (step S114), and then increments the learning number PAchg by one (step S116). Then, the CPU 202 returns to the beginning of the control routine and starts it again.

Figure 7:
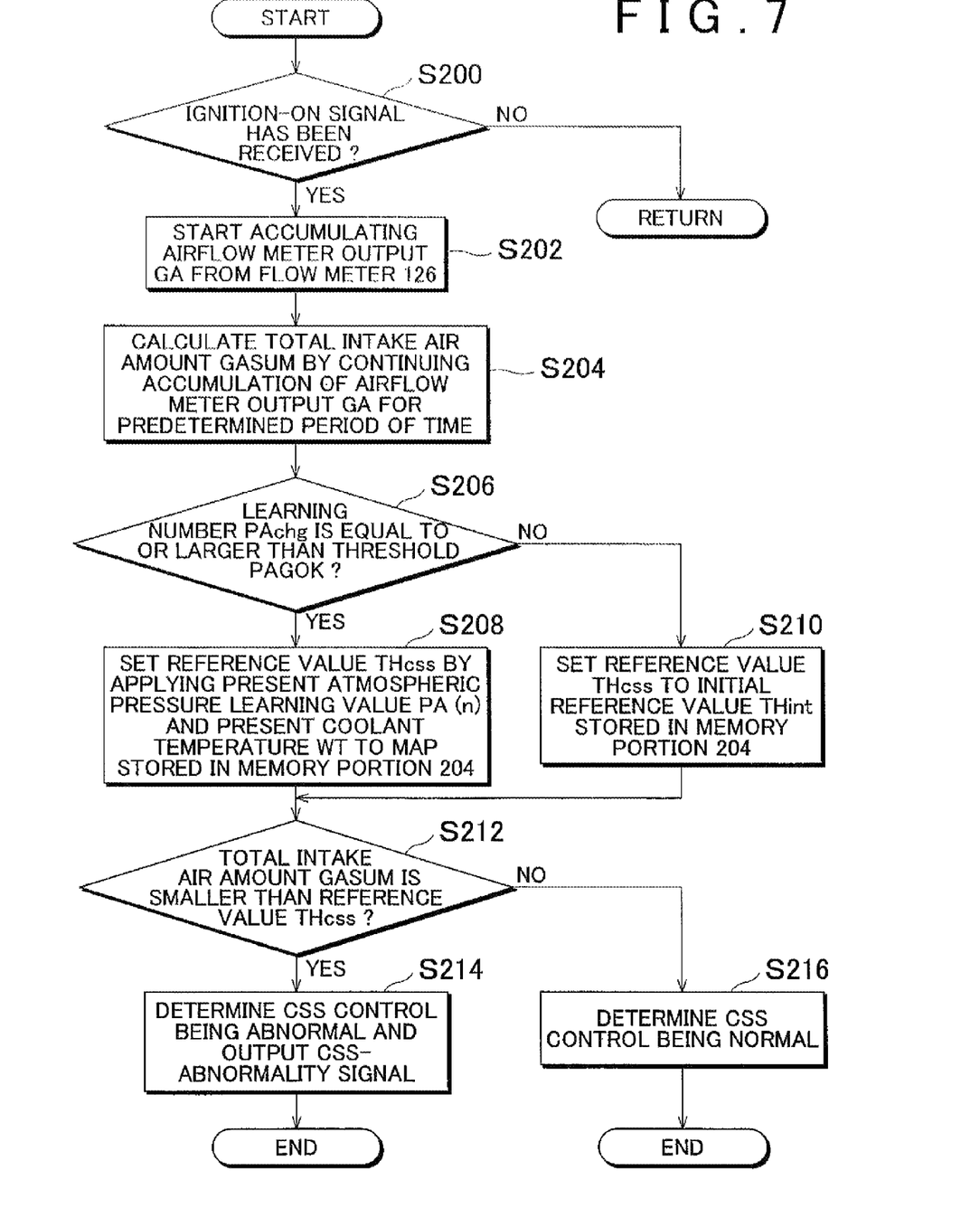
FIG. 7 is a flowchart illustrating the control routine executed by the CSS monitor section of the first example embodiment of the invention.

FIG. 7 is a flowchart illustrating the control routine executed by the CSS monitor section 400 of the first example embodiment. Note that the respective processes in this control routine are mainly executed by the CPU 202 of the control apparatus 200.

Referring to FIG. 7, the CPU 202 determines whether the ignition-ON signal has been received (step S200). If the ignition-ON signal has not been received (step S200: NO), the CPU 202 returns to the beginning of the control routine and starts it again. That is, the CPU 202 executes the processes in step S202 and its subsequent steps on the condition that the ignition-ON signal has been received.

If it is determined that the ignition-ON signal has been received (step S200: YES), the CPU 202 starts accumulating the airflow meter output GA of the flow meter 126 (step S202) and continues the accumulation for a predetermined period of time, whereby the total intake air amount GASUM is calculated (step S204).

Next, the CPU 202 determines whether the learning number PAchg is equal to or larger than the threshold PAGOK (step S206). If the learning number PAchg is equal to or larger than the threshold PAGOK (step S206: YES), the CPU 202 sets the reference value THcss by applying the present atmospheric pressure learning value PA (n) and the present coolant temperature WT to the map stored in the memory portion 204 (step S208).

On the other hand, if the learning number PAchg is smaller than the threshold PAGOK (step S206: NO), the CPU 202 sets the reference value THcss to the initial reference value THint stored in the memory portion 204 (step S210).

Subsequently, the CPU 202 determines whether the total intake air amount GASUM calculated in step S204 is smaller than the reference value THcss (step S212). If the total intake air amount GASUM is smaller than the reference value THcss (step S212: YES), the CPU 202 determines the CSS control as being abnormal and then outputs a CSS-abnormality signal (step S214), after which the CPU 202 finishes the control routine.

On the other hands if the total intake air amount GASUM is not smaller than the reference value THcss (step 212: NO), the CPU 202 determines the CSS control as being normal (S216) and finishes the control routine without outputting the CSS-abnormality signal.

According to the first example embodiment, as described above, the operation state of the engine is determined as being abnormal when the total amount of air that has been drawn into the engine for the predetermined period of time since the engine was started in response to the ignition-ON signal is smaller than the reference value corresponding to the atmospheric pressure learning value, and this reference value is set in accordance with the atmospheric pressure learning value and the number of times the atmospheric pressure learning value has been updated. That is, if the number of times the atmospheric learning value has been updated is smaller than the threshold that is large enough to determine that the accuracy of the calculated atmospheric pressure learning value is sufficiently highs the threshold is set to a value corresponding to the initial value of the atmospheric pressure learning value.

As such, the reference value can be set to a value with which the operation state of the engine (the CSS control) will not be erroneously determined as being abnormal even in a state where the degree of the learning for the atmospheric pressure learning value is not sufficient, such as immediately after the atmospheric pressure learning value has been reset as a result of excessive power discharge from the battery or as a result of the control unit being replaced with a new one. As such, it is possible to avoid erroneously determining the operation state of the engine (the CSS control) as being abnormal due to the accuracy of the calculated atmospheric pressure learning value being low.

Second Example Embodiment

While the reference value used for ascertaining the presence of an abnormality of the CSS control is selectively set based on the learning number PAchg in the first example embodiment described above, the abnormality determination logic for the CSS control may be invalidated based on the learning number PAchg. In view of this, the second example embodiment of the invention employs a structure in which a determination as to an abnormality of the CSS control is invalidated when the learning number PAchg is smaller than the threshold PAGOK, as will be described below.

The structure of a vehicle 1A incorporating a monitoring apparatus according to the second example embodiment of the invention is substantially identical to the structure of the vehicle 1 shown in FIG. 1 except the functional configuration of a control apparatus 200A, and therefore it is not described in detail here again. Further, the functional configuration of the control apparatus 200A of the second example embodiment is substantially identical to that of the control apparatus 200 of the first example embodiment except that a CSS monitor section 400A is provided in place of the CSS monitor section 400 of the control apparatus 200 of the first example embodiment. The atmospheric pressure calculation section 300 of the control apparatus 200A is the same as that of the control apparatus 200 and therefore it is not described in detail here again.

Figure 8:
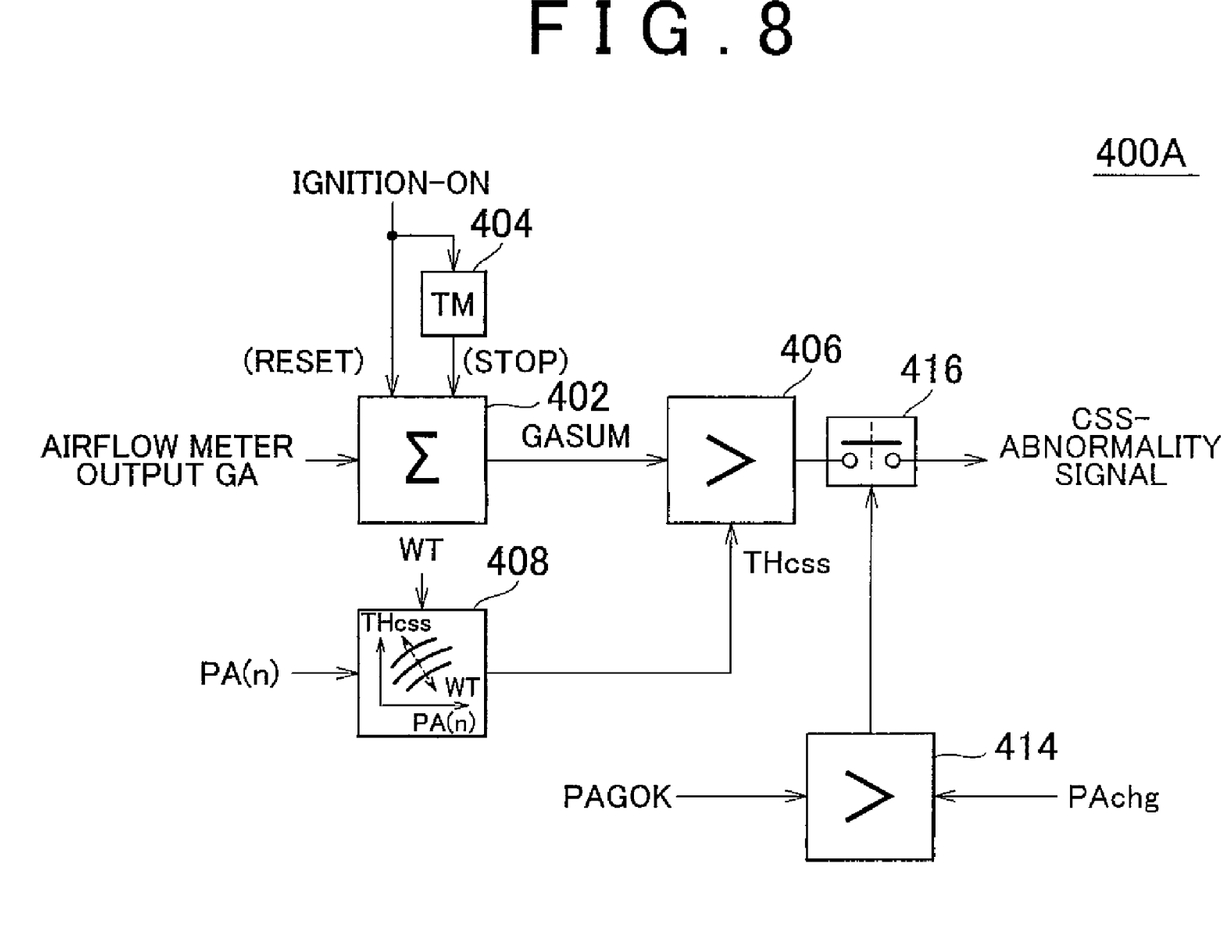
FIG. 8 is a block diagram illustrating the outline of the functional configuration of the CSS monitor section of the second example embodiment of the invention.

FIG. 8 is a block diagram illustrating the outline of the functional configuration of the CSS monitor section 400A of the second example embodiments Referring to FIG. 8, the functional configuration of the CSS monitor section 400A is substantially identical to that of the CSS monitor section 400 shown in FIG. 5 except that the initial value storage 410 and the selector 412 are replaced by an invalidator 416.

The comparator 406 compares the total intake air amount GASUM accumulated by the accumulator 402 with the reference value THcss obtained from the characteristic storage 408. If the total intake air amount GASUM is smaller than the reference value THcss, the comparator 406 determines the CSS control as being abnormal and outputs the CSS-abnormality signal.

At this time, the invalidator 416 provided on the output side of the comparator 406 interrupts the CSS-abnormality signal output from the comparator 406 in accordance with a command from the comparator 414. That is, the invalidator 416 is used to invalidate the abnormality determination logic for the CSS control.

As mentioned earlier, the comparator 414 examines the accuracy of the calculated atmospheric pressure learning value PA (n) by comparing the learning number PAchg, which represents the number of times the atmospheric pressure learning value PA (n) has been updated, with the threshold PAGOK, and if the learning number PAchg is smaller than the threshold PAGOK, the comparator 414 outputs an interruption command to the invalidator 416 to invalidate the abnormality determination logic for the CSS control.

The functions of other portions of the CSS monitor section 400A are the same as to those of the CSS monitor section 400 of the first example embodiment, and therefore they are not described in detail here again.

Figure 9:
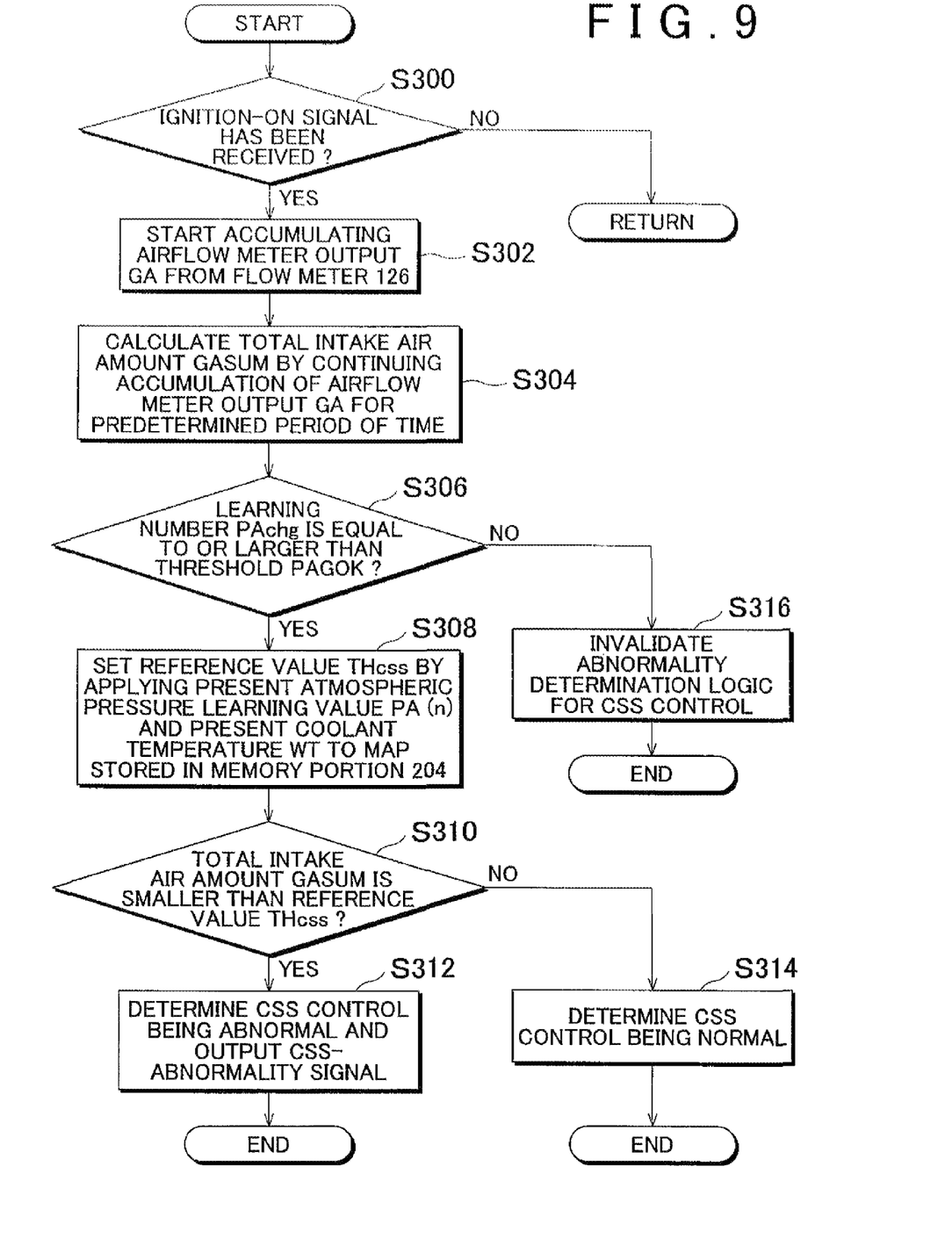
FIG. 9 is a flowchart illustrating the control routine executed by the CSS monitor section of the second example embodiment of the invention.

FIG. 9 is a flowchart illustrating the control routine executed by the CSS monitor section 400A of the second example embodiment. Note that the respective processes in this control routine are mainly executed by the CPU 202 of the control apparatus 200A.

Referring to FIG. 9, the CPU 202 determines whether the ignition-ON signal has been received (step S300). If the ignition-ON signal has not been received (step S300: NO), the CPU 202 returns to the beginning of the control routine and starts it again. That is, the CPU 202 executes the processes in step S302 and its subsequent steps on the condition that the ignition-ON signal has been received.

If it is determined that the ignition-ON signal has been received (step S300: YES), the CPU 202 starts accumulating the airflow meter output GA of the flow meter 126 (step S302) and continues the accumulation for a predetermined period of time, whereby the total intake air amount GASUM is calculated (step S304).

Next, the CPU 202 determines whether the learning number PAchg is equal to or larger than the threshold PAGOK (step S306). If the learning number PAchg is equal to or larger than the threshold PAGOK (step S306: YES), the CPU 202 sets the reference value THcss by applying the present atmospheric pressure learning value PA (n) and the present coolant temperature WT to the map stored in the memory portion 204 (step S308). Then, the CPU 202 determines whether the total intake air amount GASUM is smaller than the reference value THcss (step S310).

If the total intake air amount GASUM is smaller than the reference value THcss (step S312: YES), the CPU 202 determines the CSS control as being abnormal and then outputs the CSS-abnormality signal (step S312), after which the CPU 202 finishes the control routine. If the total intake air amount GASUM is not smaller than the reference value THcss (step 312: NO), conversely, the CPU 202 determines the CSS control as being normal (step S314) and finishes the control routine without outputting the CSS-abnormality signal.

On the other hand, if the learning number PAchg is smaller than the threshold PAGOK (step S306: NO), the CPU 202 invalidates the abnormality determination logic for the CSS control (step S316), after which the CPU 202 finishes the control routine without executing any further processes.

According to the second example embodiment, as described above, the operation state of the engine is determined as being abnormal when the total amount of air that has been drawn into the engine for the predetermined period of time since the engine was started in response to the ignition-ON signal being received is smaller than the reference value corresponding to the atmospheric pressure learning value, and if the number of times the atmospheric pressure learning value has been updated is smaller than the threshold that is large enough to determine that the accuracy of the calculated atmospheric pressure learning value is sufficiently high, the abnormality determination: logic for the CSS control is invalidated.

As such, it is possible to avoid erroneously determining the operation state of the engine (the CSS control) as being abnormal even in a state where the degree of the learning for the atmospheric pressure learning value is not sufficient, such as immediately after the atmospheric pressure learning value has been reset as a result of excessive power discharge from the battery or as a result of the control unit being replaced with a new one. As such, it is possible to avoid erroneously determining the operation state of the engine (the CSS control) being abnormal due to the accuracy of the calculated atmospheric pressure learning value being low.

Modification Examples of First and Second Example Embodiments

While the atmospheric pressure calculation section 300 calculates the atmospheric pressure based on the throttle opening degree TA and the airflow meter output GA without using any atmospheric pressure sensor in the first and second example embodiments, the atmospheric pressure may be obtained using an atmospheric pressure sensor. In the case of using an atmospheric pressure sensor, too, for the purpose of achieving a sufficient control stability and a sufficient noise immunity, the abnormality determination for the CSS control is preferably made using an atmospheric pressure learning value obtained though a given learning process.

Figure 10:
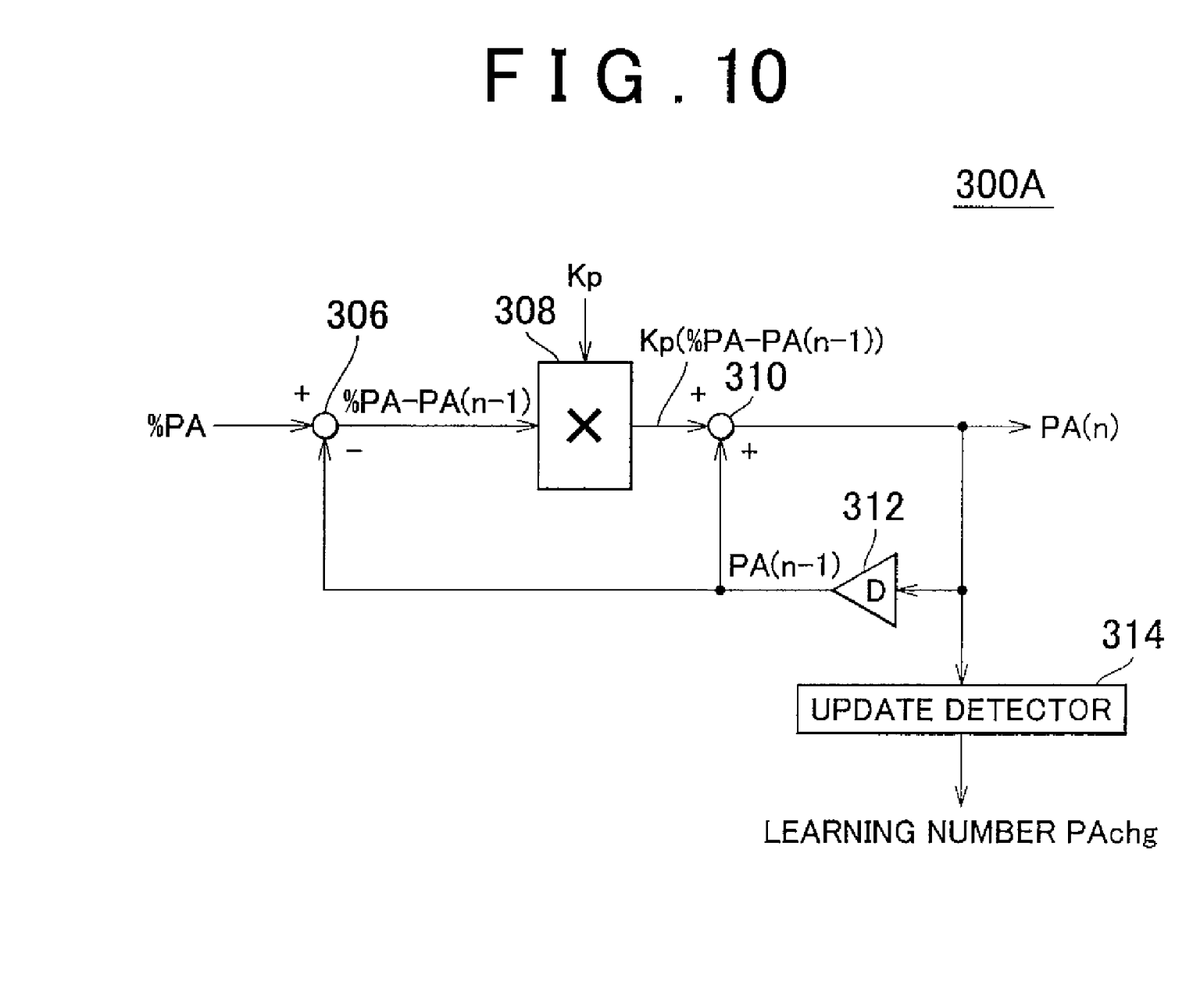
FIG. 10 is a block diagram illustrating the outline of the functional configuration of an atmospheric pressure calculation section according to a modification example of the first and second example embodiments of the invention.

FIG. 10 is a block diagram illustrating the outline of the functional configuration of an atmospheric pressure calculation section 300A according to a modification example of the first and second example embodiments.

Referring to FIG. 10, the functional configuration of the atmospheric pressure calculation section 300A is obtained by removing the divider 302 and the characteristic storage 304 from the atmospheric pressure calculation section 300 shown in FIG. 3 and adding an atmospheric pressure sensor (not shown in the drawing) that detects an atmospheric pressure % PA and inputs it directly to the subtractor 306. The atmospheric pressure sensor is, for example, a capacitance type pressure senor that detects its capacitance that changes according to the distance between electrodes that changes as the atmospheric pressure changes.

The logic of the learning performed by the atmospheric pressure calculation section 300A is substantially identical to that by the atmospheric pressure calculation section 300 described above, and therefore it is not described in detail here again.

The elements of the first and second example embodiments correspond to the elements of the invention as follows: the divider 302 and the characteristic storage 304 correspond to "atmospheric pressure obtaining portion", the subtractor 306, the multiplier 308, the adder 310, and the delayer 312 correspond to "learning value calculating portion", the accumulator 402 and the timer 404 correspond to "air amount accumulating portion", the comparator 406 corresponds to "abnormality determination portion", the comparator 414 corresponds to "comparing portion", the characteristic storage 408 and the initial value storage 410 correspond to "reference value setting portion", and the invalidator 416 corresponds to "invalidating portion".

It is to be understood that the invention is not limited to the example embodiments described above. To the contrary, the invention is intended to cover all possible modifications and equivalent arrangements within the scope of the invention as described in the claims without any limitations based on the example embodiments.

What is claimed is:

1. A monitoring apparatus for monitoring an operation state of an internal combustion engine, comprising:
    an atmospheric pressure obtaining portion that obtains an atmospheric pressure;
    a learning value calculating portion that calculates an atmospheric pressure learning value based on a record of the atmospheric pressure obtained by the atmospheric pressure obtaining portion;
    an air amount accumulating portion that accumulates the amount of air drawn into the internal combustion engine for a predetermined period of time from a start of the internal combustion engine;

an abnormality determination portion that determines the operation state of the internal combustion engine as being abnormal when the accumulated air amount is smaller than a predetermined reference value corresponding to the atmospheric pressure learning value; wherein the reference value is set in accordance with the atmospheric pressure learning value a comparing portion that compares the number of times the atmospheric pressure learning value has been updated, which corresponds to the degree of learning that the learning value calculating portion has performed for the atmospheric pressure learning value, by the learning value calculating portion with a predetermined threshold, and a reference value setting portion that sets the reference value to a value corresponding to the atmospheric pressure learning value, which is calculated by the learning value calculating portion, when the number of times the atmospheric pressure learning value has been updated by the learning value calculating portion is equal to or larger than the predetermined threshold, and the degree of learning that the learning value calculating portion has performed for the atmospheric pressure learning value.

2. The monitoring apparatus according to claim 1, further comprising:

a comparing portion that compares the number of times the atmospheric pressure learning value has been updated, which corresponds to the degree of learning that the learning value calculating portion has performed for the atmospheric pressure learning value, by the learning value calculating portion with a predetermined threshold, and a reference value setting portion that sets the reference value to a value corresponding to an initial value of the atmospheric pressure learning value, which has been set in advance by the learning value calculating portion, when the number of times the atmospheric pressure learning value has been updated by the learning value calculating portion is smaller than the predetermined threshold.

3. The monitoring apparatus according to claim 1, wherein the internal combustion engine includes a throttle mechanism that controls the flow rate of air drawn into the internal combustion engine, and the atmospheric pressure obtaining portion calculates the atmospheric pressure based on the degree of opening of the throttle mechanism and the flow rate of air drawn into the internal combustion engine.

4. The monitoring apparatus according to claim 1, wherein the atmospheric pressure obtaining portion is an atmospheric pressure sensor adapted to detect the atmospheric pressure.

5. The monitoring apparatus according to claim 1, wherein the air amount accumulating portion starts accumulating the amount of air drawn into the internal combustion engine from a start of the internal combustion engine.

6. The monitoring apparatus according to claim 1, wherein the internal combustion engine runs by combusting gasoline.

7. The monitoring apparatus according to claim 1, wherein the air amount accumulating portion suspends the accumulation of the amount of air drawn into the internal combustion engine while the internal combustion engine is being raced.

8. A monitoring apparatus for monitoring an operation state of an internal combustion engine, comprising:

an atmospheric pressure obtaining portion that obtains an atmospheric pressure;

a learning value calculating portion that calculates an atmospheric pressure learning value based on a record of the atmospheric pressure obtained by the atmospheric pressure obtaining portion;

an air amount accumulating portion that accumulates the amount of air drawn into the internal combustion engine for a predetermined period of time from a start of the internal combustion engine;

an abnormality determination portion that determines the operation state of the internal combustion engine as being abnormal when the accumulated air amount is smaller than a predetermined reference value corresponding to the atmospheric pressure learning value; a comparing portion that compares the number of times the atmospheric pressure learning value has been updated, which corresponds to the degree of learning that the learning value calculating portion has performed for the atmospheric pressure learning value, by the learning value calculating portion with a predetermined threshold; and an invalidating portion that invalidates the abnormality determination function of the abnormality determination portion when the number of times the atmospheric pressure learning value has been updated by the learning value calculating portion is smaller than the predetermined threshold ; and a reference value setting portion that sets the reference value to a value corresponding to the atmospheric pressure learning value, which is calculated by the learning value calculating portion, when the number of times the atmospheric pressure learning value has been updated by the learning value calculating portion is equal to or larger than the predetermined threshold.

9. The monitoring apparatus according to claim 8, wherein the internal combustion engine includes a throttle mechanism that controls the flow rate of air drawn into the internal combustion engine, and the atmospheric pressure obtaining portion calculates the atmospheric pressure based on the degree of opening of the throttle mechanism and the flow rate of air drawn into the internal combustion engine.

10. The monitoring apparatus according to claim 8, wherein the atmospheric pressure obtaining portion is an atmospheric pressure sensor adapted to detect the atmospheric pressure.

11. The monitoring apparatus according to claim 8, wherein the air amount accumulating portion starts accumulating the amount of air drawn into the internal combustion engine from a start of the internal combustion engine.

12. The monitoring apparatus according to claim 8, wherein the internal combustion engine runs by combusting gasoline.

13. The monitoring apparatus according to claim 8, wherein the air amount accumulating portion suspends the accumulation of the amount of air drawn into the internal combustion engine while the internal combustion engine is being raced.

14. A method for monitoring an operation state of an internal combustion engine, comprising:
obtaining an atmospheric pressure;
calculating an atmospheric pressure learning value based on a record of the obtained atmospheric pressure;
accumulating the amount of air drawn into the internal combustion engine for a predetermined period of time from a start of the internal combustion engine;
determining the operation state of the internal combustion engine as being abnormal when the accumulated air amount is smaller than a predetermined reference value corresponding to the atmospheric pressure learning value;
setting the reference value in accordance with the atmospheric pressure learning value and the degree of learning that has performed for the atmospheric pressure learning value comparing the number of times the atmospheric pressure learning value has been updated, which corresponds to the degree of learning that has performed for the atmospheric pressure learning value, with a predetermined threshold, and setting the reference value to a value corresponding to the calculated atmospheric pressure learning value when the number of times the atmospheric pressure learning value has been updated is equal to or larger than the predetermined threshold.

15. The method according to claim 14, further comprising:
comparing the number of times the atmospheric pressure learning value has been updated by the learning value calculating portion with a predetermined threshold, and
setting the reference value to a value corresponding to an initial value of the atmospheric pressure learning value, which has been set in advance, when the number of times the atmospheric pressure learning value has been updated is smaller than the predetermined threshold.

16. The method according to claim 14, wherein
the internal combustion engine includes a throttle mechanism that controls the flow rate of air drawn into the internal combustion engine, and
the atmospheric pressure is calculated based on the degree of opening of the throttle mechanism and the flow rate of air drawn into the internal combustion engine.

17. The method according to claim 14, wherein
the accumulation of the amount of air drawn into the internal combustion engine is started from a start of the internal combustion engine.

18. The method apparatus according to claim 14, wherein
the accumulation of the amount of air drawn into the internal combustion engine is suspended while the internal combustion engine is being raced.

19. A method for monitoring an operation state of an internal combustion engine, comprising:
obtaining an atmospheric pressure;
calculating an atmospheric pressure learning value based on a record of the obtained atmospheric pressure;
accumulating the amount of air drawn into the internal combustion engine for a predetermined period of time from a start of the internal combustion engine;
determining the operation state of the internal combustion engine as being abnormal when the accumulated air amount is smaller than a predetermined reference value corresponding to the atmospheric pressure learning value, comparing the number of times the atmospheric pressure learning value has been updated, which corresponds to the degree of learning that has performed for the atmospheric pressure learning value, with a predetermined threshold;
invalidating the abnormality determination when the number of times the atmospheric pressure learning value has been updated is smaller than the predetermined threshold; and setting the reference value to a value corresponding to the calculated atmospheric pressure learning value when the number of times the atmospheric pressure learning value has been updated is equal to or larger than the predetermined threshold.

20. The method according to claim 19, wherein
the internal combustion engine includes a throttle mechanism that controls the flow rate of air drawn into the internal combustion engine, and
the atmospheric pressure is calculated based on the degree of opening of the throttle mechanism and the flow rate of air drawn into the internal combustion engine.

21. The method according to claim 19, wherein
the accumulation of the amount of air drawn into the internal combustion engine is started from a start of the internal combustion engine.

22. The method apparatus according to claim 19, wherein
the accumulation of the amount of air drawn into the internal combustion engine is suspended while the internal combustion engine is being raced.

* * * * *